United States Patent [19]
Atkinson et al.

[11] 4,066,240
[45] Jan. 3, 1978

[54] SELF COMPENSATING SEAT FOR A SPHERICAL PLUG VALVE

[75] Inventors: Eulas R. Atkinson, Conroe; Willard E. Kemp, Houston, both of Tex.

[73] Assignee: ACF Industries, Incorporated, New York, N.Y.

[21] Appl. No.: 691,737

[22] Filed: June 1, 1976

[51] Int. Cl.$^2$ .............................................. F16K 25/00
[52] U.S. Cl. .................................... 251/175; 251/185
[58] Field of Search ............... 251/172, 174, 175, 181, 251/185; 137/242

[56] References Cited
U.S. PATENT DOCUMENTS

| | | | |
|---|---|---|---|
| 2,890,856 | 6/1959 | Clade | 251/174 |
| 2,942,840 | 6/1960 | Clade | 251/174 |
| 3,047,007 | 7/1962 | Lunken | 251/172 X |
| 3,371,907 | 3/1968 | Scaramucci | 251/172 X |
| 3,841,347 | 10/1974 | Kuskida | 251/174 X |

*Primary Examiner*—Harold W. Weakley
*Attorney, Agent, or Firm*—Eugene N. Riddle

[57] ABSTRACT

A ball or spherical plug valve has a pair of annular seal rings with outer peripheral portions thereof mounted in contact with the valve chamber end walls and inner annular edge portions thereof in sealing contact with the ball member and in a spaced relation to the end walls when the ball member has not been displaced by fluid pressure. Each seal ring has a substantially sharp inner edge portion contacting the ball member in substantially a line contact with the ball member when the ball member has not been displaced by fluid pressure. Each seal ring has a substantially flat inner side portion adjacent to the substantially sharp edge portion and the ball member. Upon closing of the valve against line pressure, the ball member is displaced downstream and the downstream seal ring is deformed with the inner peripheral portion thereof moved into face-to-face contact with the adjacent end wall, and the flat side portion moved into contact with the ball member to provide a relatively large contact area between the surface of the ball member and the downstream seal ring with the downstream seal ring stationary.

10 Claims, 10 Drawing Figures

SELF COMPENSATING SEAT FOR A SPHERICAL PLUG VALVE

BACKGROUND OF THE INVENTION

This invention is related to seals for ball valves or spherical plug valves in which the seal rings are constructed generally in the form of a belleville spring. In this invention, the seal ring sealing surface engages the generally spherical surface of the valve ball member in substantially a line contact when the ball is in an undisplaced position. When the ball valve member is displaced downstream upon application of fluid pressure in a closed position the seal ring contacts the ball valve member along a substantially larger sealing surface.

One goal of valve manufacturing is to produce a valve which provides a fluid tight closure for high temperature applications. Unfortunately, prior art valve constructions for ball and spherical plug valves are not particularly well adapted for high temperature applications because they generally use elastomeric or plastic seals in their construction which deteriorate or fail upon application of elevated temperatures. Special compositions of material to resist high temperatures have been constructed to replace conventional elastomeric and plastic seals in ball valves. However, these are mere substitutes in material and do not vary the basic construction of the valve.

Another goal of valve manufacture is to provide a spherical plug valve which requires a low operating torque to rotate the valve member between the open and closed positions. The above described elastomeric and plastic seals usually require a considerable amount of torque to rotate the valve member because the valve seals are constructed with a relatively large contact area with the ball member and the seal rings must be preloaded to insure a fluid tight seal at low pressure and this high preloaded construction creates a great resistance to rotation of the ball member which is undesirable. Another disadvantage of the prior art valve constructions is that the seal rings generally do not scrape or clean the ball to any significant extent as it is rotated between the open and closed positions which allow foreign matter to accumulate on the ball and be moved under the seal rings thereby scratching and deforming them and this in turn increases the possibility of leakage.

Some spherical plug valves are known in the art which have been constructed with flexible seal rings suitable for high temperature operation. One of these valves is shown in U.S. Pat. No. 2,890,856 which shows a flexible metallic seal ring having peripheral edges thereof rigidly secured radially in the valve body and having a frusto-conical portion with an inner side thereof contacting the ball valve member. While this valve employs a metallic construction it has a relatively broad sealing surface which will not clean the ball and which will require large preloading forces for low pressure sealing.

Some spherical plug valves are known which have seals that form only a line contact with the ball valve member; one such valve is shown in U.S. Pat. No. 3,556,471. This valve employs a curved surface on a pivotally mounted elastomeric or plastic seal ring to seal aginst the ball valve member. While this valve does provide line contact between the seal ring and the ball valve member it is not suitable for high temperature and because it maintains line contact at all times the seal ring is very susceptible to crushing at high pressures.

SUMMARY OF THE INVENTION

In an embodiment, a ball valve structure includes a valve body having a valve chamber therein with inlet and outlet passageways connected with the valve chamber and a ball valve member or spherical plug valve member rotatably mounted in the valve chamber for movement between open and closed positions and a deformable annular seal ring positioned around each of the inlet and outlet passageways having an inner annular edge portion in contact with the spherical surface of the ball valve member and having outer peripheral portions of the seal rings mounted in the chamber. The ball valve is assembled with the seal rings in a preloaded position where the inner annular edge portions thereof touch the ball in a line contact with sufficient pressure to effect sealing between the ball member and the seal rings when the valve is in the closed position. In this preloaded position, the seal rings are spaced from the adjacent end walls of the valve chamber. Upon positioning the ball member in the closed position with upstream fluid pressure, the ball member is displaced downstream to a pressure loaded position where the downstream seal ring is deformed to a substantially right frusto-conical shape with its inner annular portion being moved into contact with the adjacent chamber end wall. Each of the seal rings is provided with a substantially sharp inner annular edge portion and a substantially flat inner side portion adjacent to the ball member. The sharp edge portion contacts the ball member in the preloaded position and the flat side portion contacts the ball when it is in the displaced downstream position.

One object of this invention is to provide a ball valve structure overcoming the aforementioned disadvantages of the prior art valves.

Still, one other object of this invention is to provide a ball or spherical plug valve having a deformable seal ring which maintains a line contact with the ball member in a preloaded condition and has larger area of contact with the ball member when it is deformed to a pressure loaded position while at the same time maintaining sealing contact with the valve body.

Yet, another object of this invention is to provide a ball valve which is constructed to resist high temperatures by using a metal-to-metal seal construction.

Various other objects, advantages, and features of this invention will become apparent to those skilled in th art from the following discussion, taken in conjunction with the accompanying drawings, in which:

The following is a discussion and description of preferred specific embodiments of the valve and seal construction of this invention, such being made with reference to the drawings, whereupon the same referenced numerals are used to indicate the same or similar parts and/or structure. It is to be understood that such discussion and description is not to unduly limit the scope of the invention.

DETAILED DESCRIPTION

Figures 1, 2:
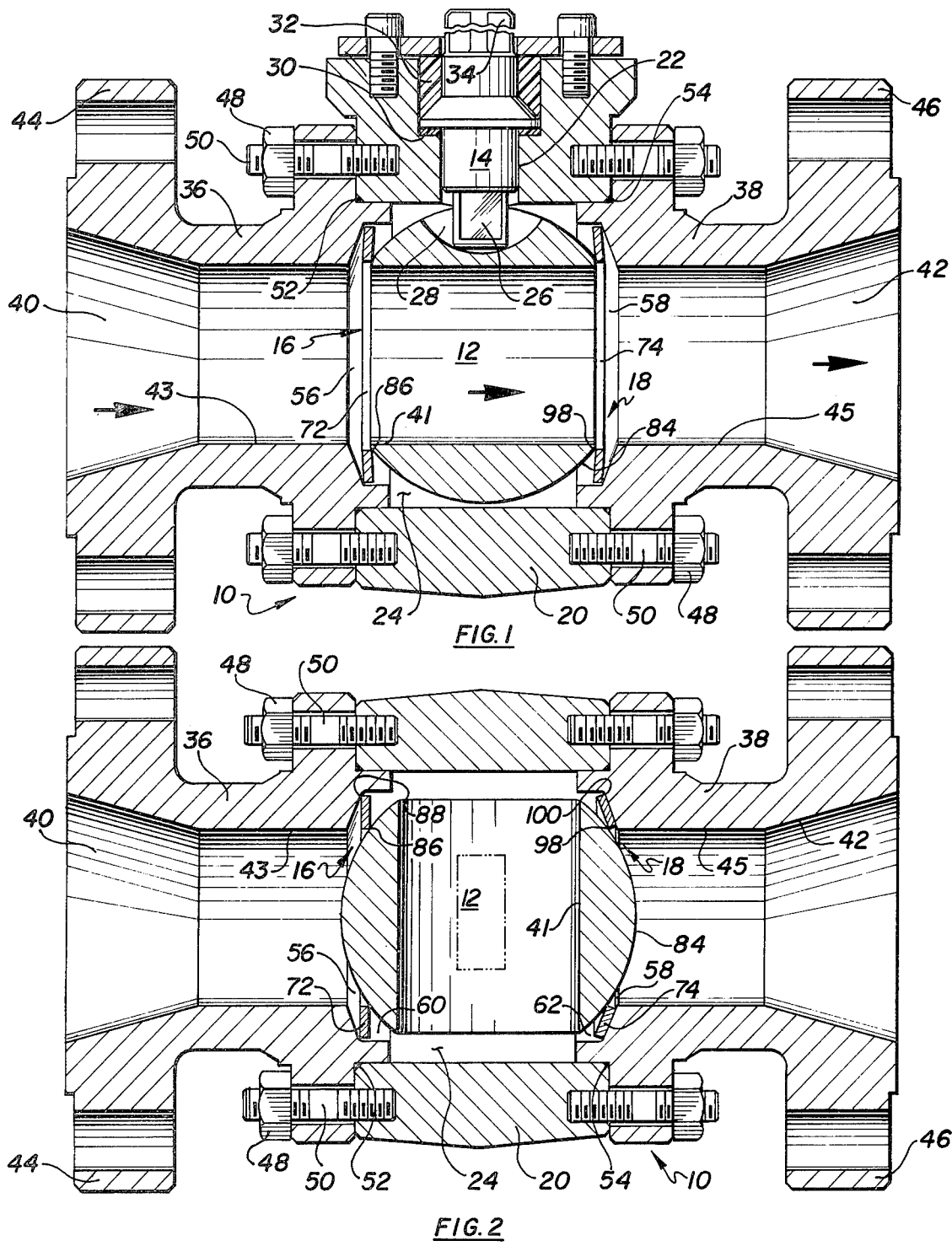
FIG. 1 is a cross-sectional elevation view of a floating ball style ball valve embodying the seal construction of this invention having the ball valve member in the open position and shown with portions thereof in full view.
FIG. 2 is a horizontally taken cross-sectional view of the valve shown in FIG. 1 with the ball member in the closed position and shifted to a pressure loaded and full displaced downstream position.

Referring to the drawings in detail and in particular to FIG. 1 wherein a hollow spherical plug or ball valve employing this invention is illustrated with such including a valve body 10 enclosing a spherical plug or ball valve member 12 and a stem 14 mounted with ball member 12 and extending through valve body 10. A pair of seal assemblies indicated generally at 16 and 18 are positioned in valve body 10 adjacent to ball valve member 12.

Valve body 10 is comprised of a center section 20 having an aperture 22 therethrough to receive stem 14. The interior of center section 24 forms a portion of valve chamber 24 and encloses ball member 12. Stem 14 has a tongue portion 26 which engages a slot 28 in ball member 12. The midportion of stem 14 is cross-sectionally circular and is surrounded by a seal ring 30 and packing 32 located in aperture 22. Stem 14 has a non-round outer portion 34 for engagement by a wrench, actuator or other rotary motion device for effecting rotation of stem 14 and ball member 12. Valve body 10 further includes a pair of end members or tail pieces 36 and 38 which are provided with inlet and outlet passageways 40 and 42 respectively communicating with valve chamber 24. Ball member 12 has a passageway 41 therethrough which aligns with inner constant diameter portions 43 and 45 of passageways 40 and 42 respectively.

End members 36 and 38 can be constructed as shown wherein they are detachable from the body center section 20, or if desired, they can be constructed integrally or with one being detachable as is well-known in the art. End members 36 and 38 are shown with flanges 44 and 46 respectively, on outer portions thereof for mounting the valve in a flanged conduit. It is to be understood that end members 40 and 42 can be constructed with threaded connections or welded connections, if desired. Valve body 10 is constructed having end members 36 and 38 secured to center section 20 a plurality of nuts 48 mounted on threaded members 50 which are positioned in a spaced relation around the end members. To seal the connection between the end members and the valve body center section 20, a pair of annular seals 52 and 54 are provided around end members 36 and 38 respectively.

The opposing inner end portions of end members 36 and 38 form opposed end walls of valve chamber 24. The opposed end walls of valve chamber 24 are defined by right frusto-conical surfaces 56 and 58 on each end member 36 and 38 respectively. As shown, passageways 43 and 45 are axially aligned and right frusto-conical surfaces 56 and 58 are divergent from the inner ends of the respective passageways. Frusto-conical surfaces 56 and 58 terminate on their outer perimeter at a juncture with inner annular and circular surfaces 60 and 62 respectively. Annular surfaces 60 and 62 are axially aligned with passageways 43 and 45 and they join frusto-conical surfaces 56 and 58 at cross-sectionally radiused corners 68 and 70 respectively. The radius of corners 68 and 70 is shown at a dimension smaller than the radius of curvature of ball member 12 however it is to be understood this radial dimension can be larger than the ball members radius of curvature if desired. Annular surfaces 60 and 62 extend to the innermost end of end members 36 and 38 and terminate at radially disposed end member end surfaces 64 and 66 respectively.

Figure 4:
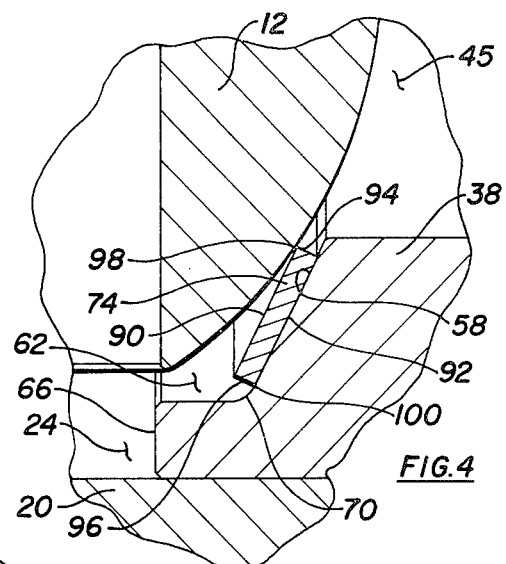
FIG. 4 is an enlarged cross-sectional view of the downstream seal ring and associated structure for the valve in the position shown in FIG. 2.

Seal assemblies 16 and 18 have respective deformable annular seal rings 72 and 74 mounted in contact with the chamber end walls and the spherical surface of ball member 12. Seal rings 72 and 74 are constructed substantially identical and composed of a deformable and resilient material. Seal rings 72 and 74 are deformed between a preloaded position and a pressure loaded position as will be described in the following. Seal rings 72 and 74 are constructed having a substantially rectangular cross section. Seal ring 72 has essentially parallel inner and outer sides 76 and 78 which are substantially perpendicular to the seal rings inner annular surface 80 and outer peripheral surface 82. With the valve positioned as shown in FIG. 1, seal ring 72 contacts spherical surface 84 of ball member 12 at a substantially sharp inner edge portion 86 between sides 76 and 80 and it contacts right frusto-conical surface 56 at a substantially sharp outer peripheral edge portion 88 between sides 78 and 82. Seal ring 74 has substantially parallel inner and outer sides 90 and 92 which are substantially perpendicular to the seal rings inner annular surface 94 and outer peripheral surface 96. With the valve positioned as shown in FIG. 1, seal ring 74 contacts ball member spherical surface 84 at a substantially sharp inner annular edge portion 98 between sides 90 and 94 and it contacts right frusto-conical surface 58 at a substantially sharp outer peripheral edge portion 100 between sides 92 and 96. When ball member 12 is in the pressure loaded and fully displaced position, as shown in FIG. 4, seal ring 74 is deformed to a concave conoidal shape with side 92 lying adjacent to and in contact with the right frusto-conical surface 58. It should be noted with emphasis that dimensions of this valve much be chosen carefully for the seal rings to function properly. It is important that the valve chamber end walls, especially the downstream one, must be shaped and dimensioned to limit maximum deformation of the seal rings to a point which will not stress the seal rings to any point beyond the elastic limit of their material of construction. Limiting deformation of the seal rings to stresses below the elastic limit is necessary so they will return from the pressure loaded position to the preloaded position and maintain the preload force on the ball valve member.

Figure 3:
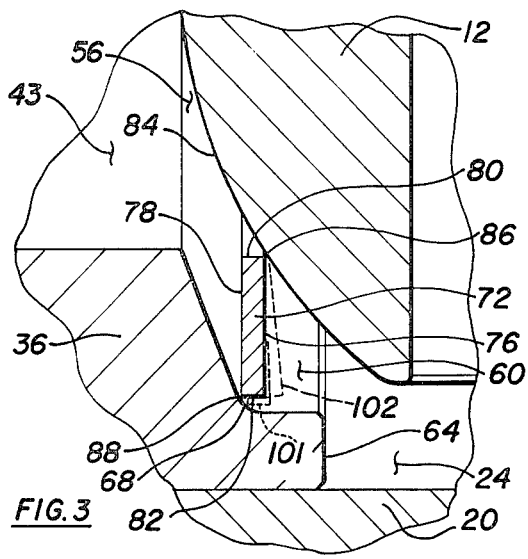
FIG. 3 is an enlarged cross-sectional view of the upstream seal ring and associated structure for the valve in the position shown in FIG. 2.

It is to be noted that in one construction of this valve, seal rings 72 and 74 can be sized so their respective outer peripheral edge portions 88 and 100 contact only right frusto-conical surfaces 56 and 58 as shown in the solid lines in FIG. 3. In another construction, seal rings 72 and 74 can be sized so their edge portions 88 and 100 contact the radiused corners 68 and 70 as shown in FIG. 3 by dashed lines indicated at 101. In either construction, the seal rings maintain essentially line sealing contact in the preloaded position.

Seal rings 72 and 74 are preferably constructed as shown with the substantially rectangularly cross section; however, it is to be understood that either one or both can be constucted with a generally trapezoidally-shaped cross section as illustrated in dashed lines at 102 in FIG. 3 without significantly departing from the scope of this invention. Furthermore, it is to be understood that either one or both of the seal rings can be constructed having a cross-sectional shape other than a general rectangular or trapezoidal shape, if desired. It is believed essential, however, that (1) the downstream seal ring has a substantially sharp inner annular edge portion contacting the spherical surface of ball member 12 in a substantially line contact area and a surface contact area on the inner side immediately adjacent the line contact area and spaced from ball member 12 in an unloaded position but in contact with the ball member in a loaded closed position; and (2) the downstream seal ring has an inner peripheral portion spaced from the adjacent body surface in a preloaded position but contacting the body surface in supporting relation when ball member 12 is in a closed loaded position.

In the specific selection of materials of construction for the valve of this invention it is worthwhile to note that such, to some extent, influences functioning of the valve seat member. Theoretically, four distinct possible material selections can be made with respect to relative hardness or resiliency of materials. In one first selection, the valve body, seat ring members and ball are of substantially the same hardness or resiliency and they are selected so that no part is dented, scratched, galled, etc. With this selection, the seal rings are deformed in substantially a pure geometrical displacement wherein the seal ring rotates about its cross-sectional geometric center with the inside diameter becoming larger and outside diameter becoming smaller as the seal ring is deformed further into a fusto-conical shape. This first selection is the construction shown in FIGS. 3 - 10 in the drawings and described in detail in the following description.

A second selection of valve body, ball member and seal ring materials involves picking the materials for these parts such that the seal ring stretches as it is deformed into the frusto-conical shape. In this selection, the seal ring is the more elastic or resilient member so that it circumferentially expands as the ball member moves downstream and contracts as the ball member returns or moves upstream. Here both the inside and outside diameter of the seal ring increase as the seal ring is deformed into the pressure loaded position in a substantially deformed frusto-conical shape.

A third selection of valve body, ball member and seal ring materials involves picking the materials for these parts such that the valve body is dented or dug into by the seal ring. In this selection, the valve body is the more elastic or resilient member so a peripheral portion of the seat contact surface of the valve body is dented or impressed temporarily by a peripheral portion of the seal ring upon deformation of the seal ring into the frusto-conical pressure loaded position. Here the outside diameter of the seal ring will remain substantially unchanged and the inside diameter thereof will be enlarged as the seal ring is deformed into the pressure loaded frusto-conical shape.

A fourth selection of valve body, ball member and seal ring materials involves picking the materials for these parts such that the ball member is dented or deformed by the seal ring when the valve is pressure loaded. In this selection, the ball member is the more elastic or resilient member so a circularly shaped area of its spherical surface is dented or impressed temporarily by the seal ring upon deformation of the seal ring by pressure loading into the frusto-conical position. Here the inside diameter of the seal ring will remain substantially constant and possibly enlarge to some small degree while its outside diameter will become smaller and possibly remain substantially constant as the seal ring is deformed into the pressure loaded frusto-conical shape.

The valve and seal construction of this invention has been constructed as shown in FIGS. 1 - 7 with the valve body, stem, ball valve member and seal rings constructed of metallic alloys, for example, stainless steel and beryelium-copper. A valve having a ball and seal rings of these materials has been successfully tested and used. It is to be understood the choice of materials from which the valve of this invention can be made is not to be restricted to metallic alloys. The valve of this invention can be constructed of non-metallic materials such as elastomers, plastics, phenolics, etc.

FIG. 1 shows the ball valve of this invention with ball member 12 in the open position which illustrates a static open position of the valve. In this position, seal rings 72 and 74 are in a preloaded position with their inner annular substantially sharp edge portions 86 and 98 respectively contacting spherical surface portions of ball valve member 12 and their outer peripheral edge portions 88 and 100 respectively, contacting the right frusto-conical end walls 56 and 58. The downstream seal rings of the valve, seal ring 74, is shown in this static open position in enlarged detail in FIG. 5. When the valve is in this open static position, ball member 12 is supported solely by the seal rings with passageway 41 being substantially aligned with inlet and outlet passageways 43 and 45. With ball member 12 in this open position, fluid can flow through the valve and ball valve member 12 will remain substantially in the position shown in FIG. 1.

When the ball member 12 is rotated to the closed position passageway 41 is then oriented substantially perpendicular to the axis of flow passageways 43 ad 45. In this position ball member 12 is displaced toward the downstream direction in an amount depending upon the fluid pressure in the upstream passageway and the deflection resistance or spring-like opposition of the downstream seal ring. FIG. 2 shows the valve with ball member 12 in the fully displaced downstream position wherein seal ring 74 is pressed into flush contact with right frusto-conical surface 58 and upstream seal ring 16 substantially undeformed position yet preferably biased sufficiently to maintain contact with right frusto-conical surface 56 and ball member spherical surface 84.

Figure 5:
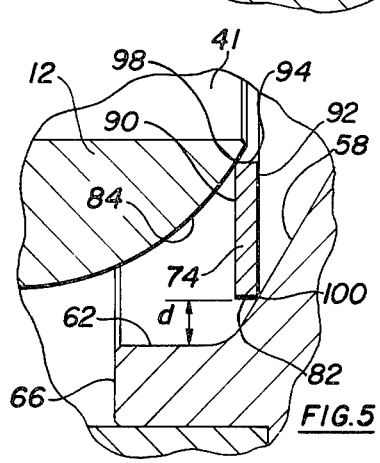
FIGS. 5, 6 and 7 are enlarged cross-sectional views of a portion of the downstream seat construction for the valve shown in FIGS. 1 - 4, with the seal shown in the succeeding figures in an open position, in a closed position with the ball valve member partially displaced downstream, and with the ball valve member in a pressure loaded and completely displaced position.
Figure 6:
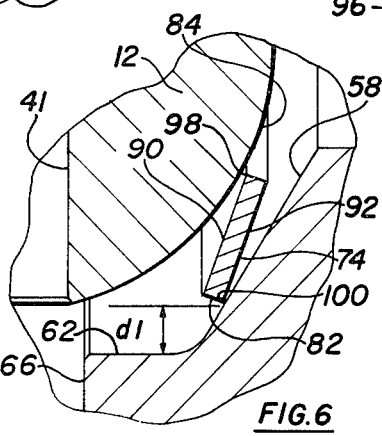
Figure 7:
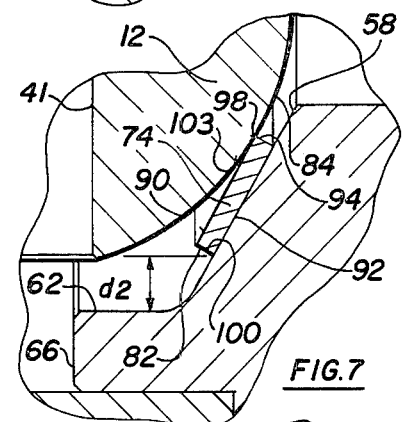

FIGS. 5, 6 and 7 illustrates the deflection of ball member 12 and the pivoting and radially displacing motion of the downstream seal ring 74 as ball member 12 is moved from the static open position to a closed position and moved to the fully displaced downstream position. FIG. 5 shows ball valve member 12 in the static open position with distance between the outermost edge of peripheral surface 82 spaced from annular surface 62 by a distance indicated at $d$. The position of the seal ring 74 will be essentially the same when ball member 12 is rotated to the closed position in so long as there is no upstream pressure on ball member 12. When upstream pressure is applied to ball member 12, the resilient nature of seal ring 74 allows it to deform and thereby permitting ball member 12 to be displaced in the downstream direction. With ball member 12 displaced downstream, the downstream seal ring is in a pressure loaded position. As ball member 12 is displaced downstream, seal ring 74 is pivoted about its points of contact with ball member 12 and right frusto-conical surface 56. An inherent physical characteristic of deforming the relatively than annular seal rings used in this valve is that they rotate about their cross-sectional geometric center so the radial dimension of seal rings is decreased as they are deformed from the flat form into the right frusto-conical form.

FIG. 6 illustrates the ball member 12 at an intermediate point of displacement. In FIG. 6 the distance between the radially outermost edge of peripheral surface 82 and surface 62 is indicated at $d1$. It is obvious upon comparing FIGS. 5 and 6 that $d1$ is substantially larger than $d$. FIG. 7 shows seal ring 74 in the fully deformed position with its side surface 92 resting flush against right frusto-conical surface 56 and ball member spherical surface 82 resting on the inner annular side portion 103 of seal ring 74 side surface 90. In this position, the distance between the radially outermost edge of peripheral surface 82 and surface 62 is indicated at $d2$. As can be observed upon comparing FIGS. 5 and 6, $d2$ is significantly larger than $d1$ thus indicating reduction of the radial dimension of seal ring 74. in practice, the radial dimension expansion of the downstream seal ring is a function of the seal ring diameter, thickness and material of construction. For example, in a valve having a seal ring of approximately 2 inches (5cm) diameter and a thickness of approximately 0.050 inch (0.125mm) the seal ring can decrease radially from about 0.00025 inch (0.00063 mm) to about 0.015 inch (0.038 mm) upon downstream displacement of the ball member to a fully displaced position. As ball member 12 is moved downstream annular sharp edge portion 98 remains in line contact with spherical surface 84 of the ball member until it reaches a point close to the fully displaced position. At this point, the seal ring is sufficiently deformed so that contact between the ball member and the seal ring is no longer between the seal rings' sharp edge portion 98 and spherical surface 84 but between seal ring side surface 90 and spherical surface 84.

The contact surface area between ball member 12 and the seal ring 74 is substantially larger in the position as shown in FIG. 7 than in the position shown in FIG. 5. Increased sealing surface area reduces bearing stresses on the seal ring which will prevent denting or permanent deformation of the seal ring or the spherical surface of ball member 12. When the ball member 12 is in the fully displaced position, forces on a ball member 12 are transmitted through seal ring 74 to the right frusto-conical surface 56 of end member 38 which effects sealing on both sides 90 and 92 of the seal ring to insure a fluid tight downstream seal in the valve. When seal ring 74 and ball member 12 are constructed of metallic materials the valve will effectively seal at extremely high temperatures when closed because of the above described construction of the sealing surfaces and the absence of elastomeric or plastic materials which are unacceptable for use at high temperatures.

When ball valve member 12 is in the fully displaced downstream and pressure loaded position shown in FIG. 7, then it is rotated to the open position and fluid pressure is communicated to the downstream passageway when one edge of passageway 41 through ball valve member 12 moves past the inner annular edge portions 86 and 98 of seal rings 72 and 74 respectively. Opening the valve drops upstream pressure on ball member 12 which allows seal ring 74 to displace ball member 12 toward the upstream direction as the upstream pressure is further reduced. As the upstream pressure becomes closer to the downstream pressure, ball member 12 is displaced further upstream to its initial static open position as shown in FIG. 1, whereupon both seal rings 72 and 74 assume their initial preloaded position. Because the seal rings have not been deformed past their yield point, they will repeatedly return to their original shape and preloaded position. A feature of the seal ring construction of this invention is that upon rotation of a ball member 12 from closed position to the open position or vice versa the substantially sharp edge portions 86 and 98 scrape and clean a portion of the spherical surface of a ball member 12 and frusto-conical surfaces 56 and 58. This scraping action aids sealing by preventing foreign material from accumulating on surfaces which contact the seal rings thereby lessening the possibility of damaging the seal rings and the other sealing surfaces due to foreign material. Another feature of the seal ring construction of this invention is that when the ball member 12 is in the open position body pressure in the valve chamber 24 can be relieved when it reaches a pressure sufficient to deform the seal rings enough to lift either sharp edge seal ring edges 86 and 98 from the spherical surface of the ball member. Seal rings 72 and 74 are biased to maintain contact with the spherical surface of ball member 12, however, they can be biased to an extent which would prevent body pressure from displacing them sufficiently to pass fluid from valve body chamber 24 into ether the upstream or downstream passageway.

Figure 8:
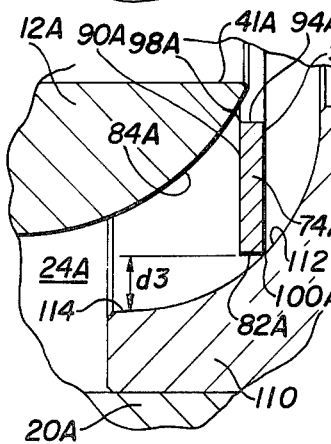
FIGS. 8, 9 and 10 illustrate an additional embodiment of the seal ring construction of this invention wherein the valve body has a curvilinear and convex shaped portion in each end of the valve chamber to support the outer peripheral portion of the seal ring and with the succeeding figures showing the ball member and the seal ring in an open and preloaded position, in a closed and partially displaced downstream position, and in a closed and completely displaced downstream position.
Figure 9:
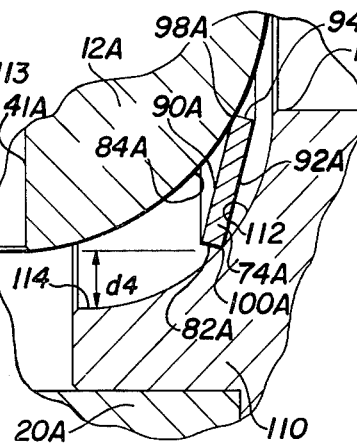
Figure 10:
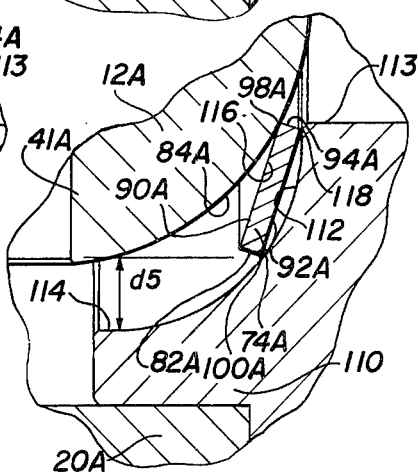

FIGS. 8, 9 and 10 illustrate another embodiment of the end member construction for a valve employing the novel seal ring features of this invention. The downstream seal ring and end member associated therewith are shown in FIGS. 8, 9 and 10. It is to be understood that both the upstream and downstream end member can be constructed similarly, if desired. For convenience in description like portions of the seal ring and ball member shown in FIGS. 8, 9 and 10 are given identification numerals similar to portions of the drawings previously described only followed by the letter A. FIGS. 8, 9 and 10 show a ball valve body end member 110 which is constructed with a substantially smooth concave surface 112 on the inner end portion thereof forming the ends of valve chamber 24A. Concave surface 112 extends generally perpendicular to and radially outwardly from end member outlet passageway surface 113 and curves toward the innermost end of the end member and having an essentially annular surface portion 114 of substantially constant radius at its innermost end forming an annular surface portion 114. Although the radius of curvature of concave surface 112 is shown as constant and of a lesser dimension than the seal ring radius or the ball member radius it is to be understood this curvature can have a variable radius and be of a greater dimension than the radius of the seal ring or the ball member. As shown in FIG. 8, seal ring 74A contacts the spherical surface 84A of ball member 12A and a midportion of concave surface 112 when ball member 12A is in a static open or closed position much the same as the seal ring does in FIG. 5 described above. In the position shown in FIG. 8 seal ring 74A is biased to contact spherical surface 84A at inner annular substantially sharp edge portion 98A and to contact concave surface 112 at substantially sharp peripheral edge portion 100A. In this position, the outer peripheral edge of seal ring 74A is positioned a distance d3 from annular surface 114. Just as described above, seal ring 74A reduces in its radial diameter as it is deformed from a substantially flat form into a right frusto-conical shape by downstream displacement of ball member 12A. FIG. 9 shows ball member 12A in a partially downstream displaced position with the outer peripheral edge thereof spaced a distance d3 from annular surface 114. Just as described above, seal ring 74A reduces in its outside diameter as it is deformed into a right frusto-conical shape by downstream displacement of ball member 12A. FIG. 9 shows ball member 12A in a partially downstream displaced position with the outer peripheral edge thereof spaced a distance d4 from annular surface 114. Upon comparing FIGS. 8 and 9, it can be observed that d4 is substantially greater than d3 indicating reduction in outer diameter. Upon downstream displacement of ball member 12A outer peripheral sharp edge portion 100A slides on smooth conical surface 112 and seal ring 74A rotates about this point.

FIG. 10 shows ball valve member 12A in a completely displaced downstream position wherein spherical surface 84A of ball member 12A rests on the inner annular side portion 116 of seal ring side surface 90A, outer peripheral edge 100A rests in contact with conical surface 112 and the peripheral edge portion 118 on side 92A of seal ring 74 rests in contact with concave surface 112. In this position, seal ring 74A and ball member 12A are in the fully displaced position. The outer peripheral seal ring edge 100A is spaced a distance d5 from annular surface 114. Upon comparing FIGS. 8, 9 and 10, it can be observed that d5 is significantly larger than d3 or d4, illustrating reduction in outer diameter of the seal ring upon deformation. In this fully displaced position, forces on ball member 12A are transmitted through seal ring 74A to edge portions 100 and 118 which provide the downstream seal in the valve. When ball member 12A is rotated to the open position, seal ring 74A moves similar to the movement described above in conjunction with FIGS. 1 – 7 whereupon seal ring 74A is returned to its preloaded position as shown in FIG. 8 and its sharp edge portions 98A and 100A scrape spherical surface portions 84A and the concave surface 112 to clean the surfaces and prevent the buildup of foreign material. As set forth above, the seal rings must be deformed only in their elastic range and by doing this, they will return to their preloaded position after being deformed to the pressure loaded position repeatedly. Functionally, the valve body and seal ring construction shown in FIGS. 8, 9 and 10 have the same advantages as that described above in conjunction with FIGS. 1 – 7, with the further feature of providing two points of substantially line contacts for sealing purposes when ball member is in the displaced downstream position. In some services and operating conditions, the two points of line contact can be desirable for low pressure sealing of the valve.

As will become apparent from the foregoing description of the applicant's ball valve structure, a relatively simple and efficient ball valve and seal structure therefor have been provided. The seal structure is relatively simple in construction and adapted for use in all metallic seal construction, in a high temperature service environment.

What is claimed is:
1. A ball valve, comprising:
 a. a valve body having inlet and outlet flow passageways and a valve chamber therebetween, a ball member having a passageway therethrough mounted in said valve chamber for rotation between open and closed positions of said ball member passageway relative to said inlet and outlet flow passageways;
 b. said valve chamber being located at the junctures of said flow passageways and having opposed end walls extending generally radially outwardly from said passageways;
 c. a one piece deformable annular metallic seal ring of a uniform generally rectangular cross-section positioned in said valve chamber around each of said inlet and outlet passageways to form upstream and downstream seal rings, said generally rectangular seal rings each having a relatively sharp inner edge portion in a substantially line sealing contact area with said ball member and in a spaced relation to the adjacent chamber end wall in a preloaded position, said seal rings each having an inner relatively large ball contact surface immediately adjacent the line contact area and out of contact with said ball member in preloaded position, each seal ring has an outer peripheral edge portion in sliding contact with the associated end wall such that said outer peripheral edge portion will slide on said associated end wall upon displacement of said ball member from one position to another as said ball member moves in general longitudinal alignment with said inlet and outlet flow passageways;
 d. the downstream seal ring upon positioning of said ball member in said closed position and displacement of said ball member downstream by fluid pressure to a pressure loaded position being pivoted generally about said outer peripheral edge portion with said outer peripheral edge portion sliding radially inward relative to the associated flow passageway and with the inner edge portion thereof being moved into contact with the adjacent chamber end wall and with said inner ball contact surface being moved into contact with said ball member to provide a relatively large contact area between the surface of said ball member and said downstream seal ring, said valve chamber end wall being spaced from said ball valve member a predetermined distance in said preloaded position such that displacement of said ball valve member from said preloaded position to said pressure loaded position will not deform said annular seal ring beyond a point which will prevent it from returning to its original free shape.

2. The valve of claim 1, wherein:
 a. said end walls define frusto-conical surfaces diverging from said inlet and outlet flow passageways, and
 b. said valve body comprises a center body portion and at least one removably mounted tail piece, said tail piece having one of said end walls.

3. The valve of claim 1, wherein said end walls are curved and define concave surfaces relative to the interior of said chamber, said concave surfaces each curving outwardly from said inlet and outlet passageways toward the opposite end of said chamber in opposing relation.

4. The valve of claim 1, wherein:
a. each of said chamber end walls has a radially inclined surface in contact with said seal ring outer peripheral portions; and
b. each of said seal rings has substantially flat and substantially parallel sides bounded by annular edges substantially perpendicular to said parallel sides.

5. A ball valve, comprising:
a. a valve body having inlet and outlet flow passageways and a valve chamber therebetween, a ball member having a passageway therethrough mounted for rotation between open and closed positions of said ball member passageway relative to said inlet and outlet passageways;
b. a one piece deformable annular metallic seal ring of a uniform generally rectangular cross-section in said valve chamber around each of said inlet and outlet passageways, said seal rings each having an inner periphery with a relatively sharp annular edge portion thereof in line sealing contact with the exterior surface of said ball member in a preloaded position;
c. said valve body having mount means in said valve chamber to pivotally and slidably mount outer peripheral edge portions of said seal rings for radially inward and radially outward motion of said outer peripheral edge portions relative to said inlet and outlet flow passageways upon displacement of said ball member from one position to another as said ball member moves in general longitudinal alignment with said inlet and outlet flow passageways, said mount means having means to limit deformation of said seal rings upon displacement of said ball member;
d. each of said seal rings having an inner relatively large ball contact surface immediately adjacent said annular edge portion and being out of contact with said ball member in a preloaded position of the ball member, the inner periphery of each seal ring being spaced from the means to limit in the preloaded position; and
e. the downstream seal ring upon positioning of said ball member in said closed position and displacement of said ball member downstream by fluid pressure to a pressure loaded position being pivoted generally about the outer peripheral edge portion thereof with said outer peripheral edge portion sliding radially inward relative to the associated flow passageway and with the inner periphery of the downstream seal ring being moved into contact with said means to limit and the inner ball contact surface being moved into contact with said ball member to provide a relatively large contact area between the surface of said ball member and said downstream seal ring, said means to limit being spaced from said ball member a predetermined distance in said preloaded position so that displacement of said ball member from said preloaded position to said pressure loaded position will not deform said seal rings beyond their elastic limit.

6. The valve of claim 5, wherein said ball member is a floating ball member and said seal rings support said ball member in said valve chamber.

7. The valve of claim 5, wherein:
a. said mount means has a smooth seal ring contact surface at opposite ends of said valve chamber, and
b. said seal rings outer peripheral edge portions have a substantially sharp outer circumferential edge portion in sealing contact with said smooth seal ring contact surface.

8. The valve of claim 5, wherein said mount means has a pair of substantially right frusto-conically shaped surfaces at opposite ends of said valve chamber around said inlet and outlet passageways, said frusto-conical surfaces diverging from said inlet and outlet passageways with outer peripheral portions thereof directed toward the opposite end of said valve chamber.

9. The valve of claim 5, wherein said mount means has a pair of curved concave surfaces at opposite ends of said chamber around said inlet and outlet passageways, said concave surfaces each curving outwardly from said inlet and outlet passageways at each end of said chamber with outer portions thereof directed toward the opposite end of said valve chamber.

10. The valve of claim 5, wherein said mount means has a smooth seal ring contact surface at opposite ends of said valve chamber, said smooth seal ring contact surface joins an essentially cross-sectionally round annular portion of said valve chamber at a smooth and cross-sectionally radiused portion, said seal ring having a peripheral edge portion thereof contacting said radiused portion in said preloaded position.

* * * * *